United States Patent [19]
Mizokami

[11] Patent Number: 4,514,074
[45] Date of Patent: Apr. 30, 1985

[54] EXPOSURE CONTROL CIRCUIT FOR TTL AUTOMATIC ELECTRONIC FLASH

[75] Inventor: Kazunori Mizokami, Hachioji, Japan

[73] Assignee: Olympus Optical Company Ltd., Tokyo, Japan

[21] Appl. No.: 433,455

[22] Filed: Oct. 8, 1982

[30] Foreign Application Priority Data

Dec. 28, 1981 [JP] Japan .................. 56-211657

[51] Int. Cl.$^3$ .................................. G03B 7/16
[52] U.S. Cl. ..................... 354/416; 354/418; 354/422; 354/448; 354/441
[58] Field of Search .................... 354/33–37, 354/41–43, 27, 139, 416–418, 420, 422, 423, 441, 448

[56] References Cited

U.S. PATENT DOCUMENTS 4,367,023 1/1983 Ishida et al. ............... 354/35 X
4,371,243 2/1983 Takishima et al. ............ 354/139 X

FOREIGN PATENT DOCUMENTS 55-11238 1/1980 Japan .

Primary Examiner—L. T. Hix
Assistant Examiner—Della J. Rutledge
Attorney, Agent, or Firm—Louis Weinstein

[57] ABSTRACT

An exposure control circuit associated with TTL automatic electronic flash includes a diaphragm control circuit. When the electronic flash is mounted on a TTL direct photometry camera capable of photometry of reflection from a film surface in order to take a picture with the aid of the electronic flash, the diaphragm control circuit assures the emission of light from the electronic flash in a reliable manner, by automatically establishing a diaphragm value between a given diaphragm value and a minimum diaphragm value, the established diaphragm value assuring a proper exposure with an exposure period which is closely synchronized with the operation of the electronic flash.

13 Claims, 8 Drawing Figures

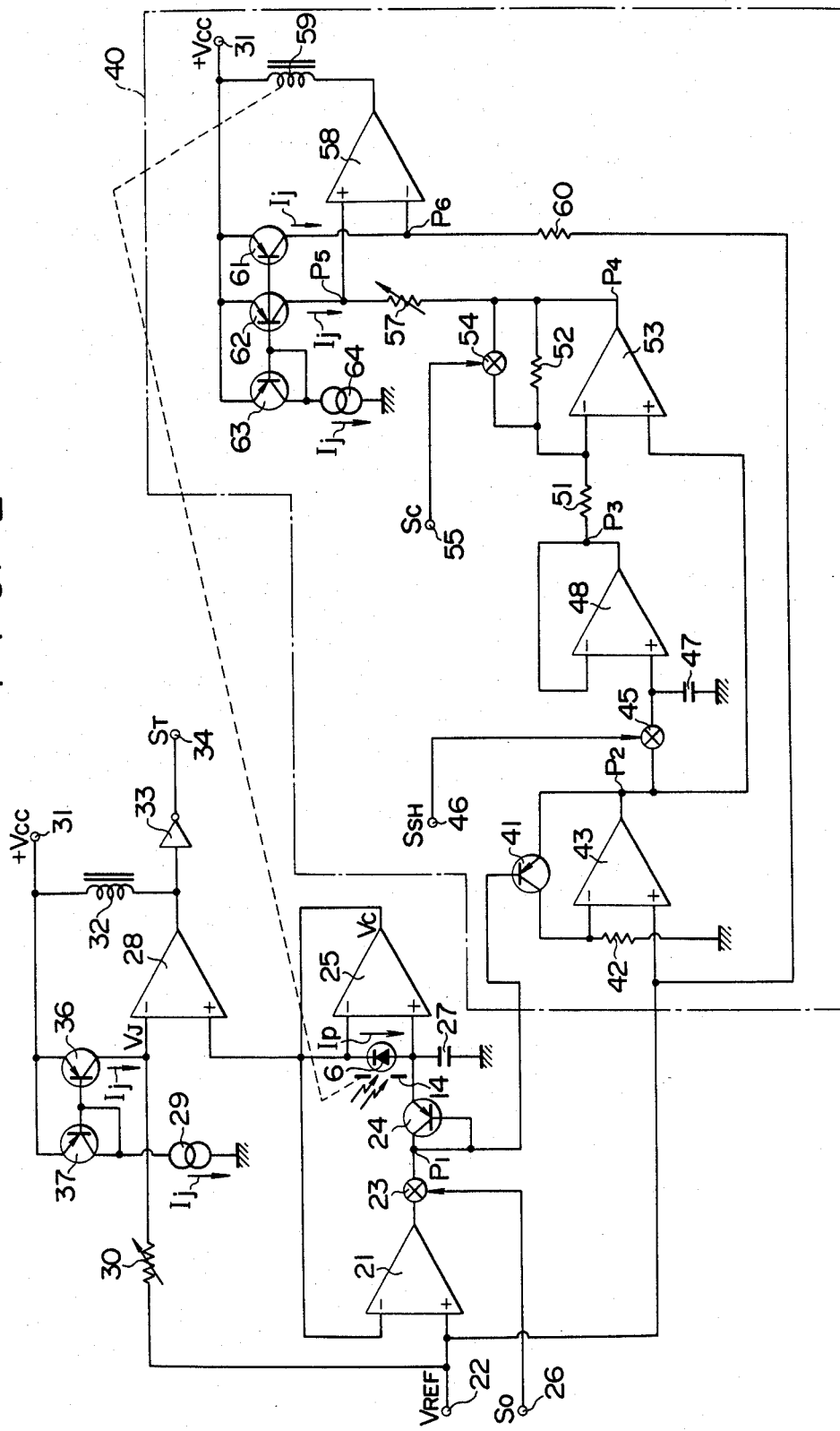
F I G. 2

EXPOSURE CONTROL CIRCUIT FOR TTL AUTOMATIC ELECTRONIC FLASH

BACKGROUND OF THE INVENTION

The invention relates to an exposure control circuit for a TTL (through-the-lens) automatic electronic flash, and more particularly, to an exposure control circuit for use with a camera capable of photometry of reflection from a film surface and having the capability to control the emission of light from a TTL automatic electronic flash and in which the exposure control circuit includes a diaphragm control circuit associated with the TTL automatic electronic flash for controlling a diaphragm aperture when taking pictures utilizing the automatic electronic flash.

In a conventional combination of a single lens reflex camera and an automatic electronic flash, a value of diaphragm aperture specified by the electronic flash is automatically preset in the camera in response to a charging complete signal fed from the electronic flash, and an exposure period is in fixed synchronized relationship with the operation of the electronic flash. Such technique is applicable to an arrangement in which the emission of light is controlled by the emission terminating capability of the automatic electronic flash itself.

By contrast, with a recently developed TTL automatic electronic flash in which the emission of light is controlled by an exposure control circuit of a TTL direct photometry camera, namely, a camera capable of photometry of reflection from a film surface, it is unnecessary to fix the diaphragm aperture of the camera to any specific value such as F2.8, F5.6 or the like, but any aperture may be used. The emission of light from the electronic flash occurs when the shutter is fully open so as to compensate for any insufficient illumination provided by natural light, and hence it is also unnecessary to choose an exosure period in timed relationship with the operation of the electronic flash, thus presenting a large departure from the control of light emission from the electronic flash prevailing in the prior practice.

However, when a TTL direct photometry camera capable of photometry of reflection from a film surface is used in cooperation with TTL automtic electronic flash, the electronic flash may emit light or may not emit light depending on the choice of a diaphragm aperture, except when a very bright illumination is provided to an object being photographed. Specifically, when the diaphragm aperture is reduced, the exposure supplied by natural light decreases to result in an increased length of exposure period, so that the synchro contacts are closed to cause the emission of light from the electronic flash when the shutter is fully open (synchronized with the operation of the electronic flash). Conversely, when the diaphragm aperture is increased, an increased amount of exposure supplied by natural light results in a reduced length of exposure period, failing to close the synchro contacts and thus causing the photographing operation to be performed under natural light alone.

However, since the intended purpose of having the electronic flash to cooperate with the camera is to achieve an electronic flash effect upon the photographing operation, it is desired that the electronic flash be reliably triggered during the photographing operation when the above combination is used. It is also desired that without losing the characteristics of photographing operation made with the aid of TTL automatic electronic flash, the use of the entire range of diaphragm aperture from its maximum to its minimum value be allowed.

When a photograph is taken with an electronic flash, there is a likelihood that a picture of sufficient quality is not obtained at the full-open diaphragm value by reason of the characteristics of the taking lens. Moreover, when the object being photographed is located in a near distance (for example, 2-3 m), it often occurs that a picture is over-exposed when using flashlight photography at the full-open diaphragm value. For example, the proper exposure is obtained at the guide number $GN=2.8$ under the condition that the full-open F number is 1.4 and the object distance is 2 m. It is difficult to properly control such a small amount of the light emission from the electronic flash at a guide number of $GN=2.8$.

SUMMARY OF THE INVENTION

In view of the foregoing, it is an object of the invention to provide an exposure control circuit for use in a TTL direct photometry camera capable of photometry of reflection from a film surface and including a diaphragm control circuit which automatically controls a diaphragm aperture to a value that enables an exposure period to be established which is closely synchronized with the operation of the electronic flash, in accordance with the brightness of an object being photographed whenever the camera is used in cooperation with TTL automatic electronic flash.

It is another object of the invention to provide an exposure control circuit for use in a TTL direct photometry camera capable of photometry of reflection from a film surface and including diaphragm control circuit, in which the diaphragm aperture is compulsorily reduced by a predetermined value at the time of a photographing operation while the exposure control circuit is receiving an electronic flash in use condition signal.

The invention brings forth a number of advantages;

(1) the camera need not be restricted to any particular diaphragm aperture such as in accordance with the open F-number signal of the taking lens as in the prior practice, but a diaphragm value from an open value (or an aperture value less than the open value by a given number of steps) to a minimum value can be automatically established, taking advantage of the characteristic operation of TTL automatic electronic flash;

(2) unless an object being photographed is under very bright illumination, a diaphragm aperture is established which permits an exposure period, controlled in accordance with the photometry of reflection from a film surface, to be synchronized with the operation of the electronic flash, thus assuring a reliable emission of light from TTL automatic electronic flash;

and (3) a diaphragm aperture is established which assures an exposure period closely synchronized with the operation of the electronic flash in order to prevent an exposure period of an increased length of time when the period is controlled by the photometry of reflection of natural light from a film surface. This assures a minimum emission of light from the electronic flash, thus reducing the time required for the electronic flash to be prepared for a next emission of light.

In accordance with another aspect of the invention, since the diaphragm aperture is reduced by a predetermined value whenever a flashlight photography is taken, a picture of sufficient quality can be obtained and the picture is not over-exposed for the object being photographed which is located in a near distance.

BRIEF DESCRIPTION OF THE DRAWINGS

FIG. 2 is a circuit diagram of an exposure control circuit according to one embodiment of the invention;

DESCRIPTION OF PREFERRED EMBODIMENTS

Figure 1:
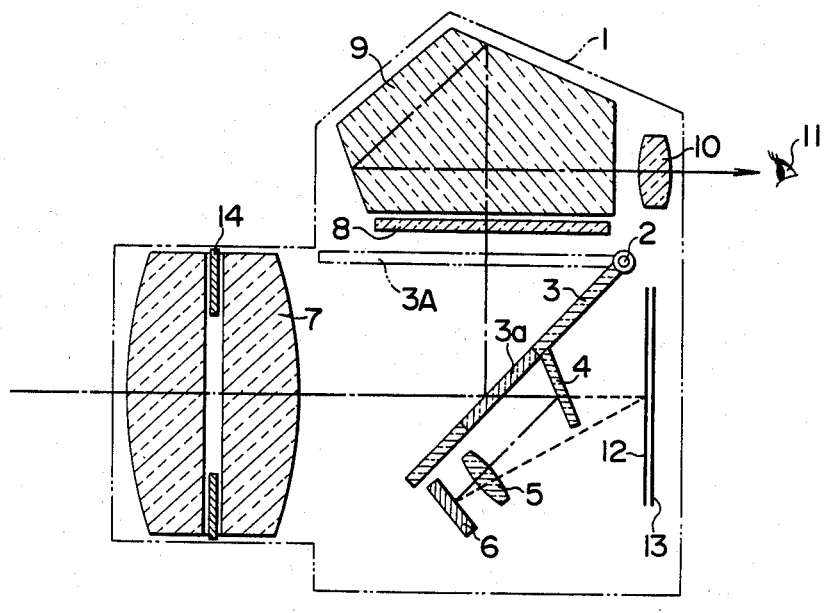
FIG. 1 is a schematic cross section of a single lens reflex camera of the TTL direct photometry type or capable of photometry of reflection from a film surface incorporating a diaphragm control circuit of the invention.

Referring to FIG. 1, there is shown a camera 1 including a mirror box (not shown). Within the mirror box, a movable mirror 3 which is used for observation purpose is rotatably mounted on a support pin 2, and carries a photometry mirror 4 on its back side. A collector lens 5 and a photometric, photoelectric transducer element 6 such as a silicon photodiode are disposed below the movable mirror 3 at a location out of a taking light path. The transducer element 6 has a light receiving surface which is disposed opposite to the reflecting surface of the mirror 4 and the front surface of a first blind 12 of a focal plane shutter whenever the movable mirror 3 assumes its 45° position as shown. Accordingly, light from an object being photographed which passes through a taking lens 7 and a diaphragm 14 having an open value and which has transmitted through a half mirror section 3a of the mirror 3 is reflected by the mirror 4 for incidence upon the light receiving surface of the transducer element 6 through the collector lens 5. In this manner, the transducer element 6 effects photometry of light from an object being photographed when the diaphragm 14 is open, before a shutter release takes place. Light from an object being photographed which is reflected by the movable mirror 3 impinges upon a focussing glass 8 and then passes through a pentaprism 9 and an eyepiece 10 to be incident on the eye 11 of a photographer for observation purposes. When a shutter release takes place, a diaphragm control circuit controls the aperture of the diaphragm 14. As will be described, the aperture of the diaphragm 14 is automatically established in accordance with the amount of light received by the transducer element 6 or the brightness of an object being photographed, and film speed used. When the control of diaphragm aperture is completed, the movable mirror 3 is resiliently driven upward to its position 3A shown in phantom line, thus closing the observation light path and opening the taking light path. When the taking light path is open, the first blind of the shutter begins running, and hence light from an object being photographed is focussed on the front surface of the running first blind 12 and the photosensitive surface of a film 13 which becomes exposed as the first blind runs. The focussed light is then reflected by the respective surfaces to impinge upon the transducer element 6 through the collector lens 5, whereby the transducer element 6 effects photometry of the light from an object being photographed subsequent to the shutter release.

FIG. 2 is a circuit diagram of an exposure control circuit, including a diaphragm control circuit, of the described camera which is capable of photometry of reflection from a film surface. Referring to FIG. 2, there is provided an operational amplifier 21 having a non-inverting input terminal which is connected to a terminal 22, to which a reference voltage $V_{REF}$ is applied. The output terminal of the amplifier is connected through a semiconductor analog switch 23 to the base and collector of a PNP transistor 24, which provides a logarithmic compression. The emitter of the transistor 24 is connected to the non-inverting input terminal of an operational amplifier 25, which operates as an integrator. The transducer element 6 has its anode connected to the non-inverting input terminal and its cathode connected to the inverting input terminal of the amplifier 25. An integrating capacitor 27 is connected between the non-inverting input terminal of the amplifier 25 and the ground. The semiconductor analog switch 23 includes a control terminal which is connected to a terminal 26, to which a trigger signal $S_O$ is applied. The trigger signal $S_O$ changes from its "H" (high) level to its "L" (low) level in synchronized relationship with the beginning of running of the first blind subsequent to the diaphragm control which takes place in response to the shutter release. The output terminal of the amplifier 25 is connected to the inverting input terminals of the amplifiers 25 and 21, thus forming a feedback loop. The output terminal of the amplifier 25 is also connected to the non-inverting input terminal of an operational amplifier 28, which functions as a comparator. The inverting input terminal of the amplifier 28 is connected to the collector of a PNP transistor 36, and is also connected to one end of a variable resistor 30, the other end of which is connected to the terminal 22. The variable resistor 30 is utilized to preset film speed which is used in calculating an exposure period in accordance with film speed information. The base of the transistor 36 is connected to the base and the collector of a PNP transistor 37 which exhibits an identical characteristic with the transistor 36. The collector of the transistor 37 is connected to the ground through a constant current source 29. The emitters of both transistors 36, 37 are connected to a terminal 31, to which a supply voltage $+V_{cc}$ is applied. The output terminal of the amplifier 28 is connected to one end of an electromagnet 32, the other end of which is connected to the terminal 31. The electromagnet 32 functions to constrain the second blind of the shutter from running. The output terminal of the amplifier 28 is also connected through an inverter 33 to a terminal 34, from which an emission terminate signal $S_T$ is delivered to an associated electronic flash.

The junction $P_1$ between the switch 23 and the transistor 24 is connected to the base of a PNP transistor 41 which represents the input to a diaphragm control circuit 40. The collector of the transistor 41 is connected to the inverting input terminal of the amplifier 43 while its emitter is connected to the output terminal thereof. The inverting input terminal of the amplifier 43 is connected to the ground through a resistor 42 while the non-inverting input terminal is connected to the terminal 22. The combination of resistor 42, transistor 41 and amplifier 43 forms a correction circuit which transforms the brightness value (Bv) of an object being photographed during an open photometry into a linear quantity which is suitable for use in apex calculation.

The output terminal of the amplifier 43 is connected through a semiconductor analog switch 45 to the non-inverting input terminal of an operational amplifier 48, which represents an impedance converter. The switch 45 has a control terminal which is connected to a terminal 46, to which a sample-and-hold signal $S_{SH}$ is applied. The signal $S_{SH}$ assumes an "H" level before the shutter release, but changes to "L" level in synchronized relationship with the shutter release. The non-inverting input terminal of the amplifier 48 is connected to the ground through a capacitor 47, which is operative to hold the output voltage from the amplifier 43. The inverting input terminal of the amplifier 48 is connected to an output terminal thereof, which is in turn connected through a resistor 51 to the inverting input terminal of an operational amplifier 53. The non-inverting input terminal of the amplifier 53 is connected to the output terminal of the amplifier 43 through resistor 51. A resistor 52 is connected between the inverting input terminal and the output terminal of the amplifier 53, and is shunted by a semiconductor analog switch 54. The combination of the resistors 51, 52 and amplifier 53 forms a non-inverting amplifier. The switch 54 includes a control terminal which is connected to a terminal 55, to which an electronic flash charged signal Sc is applied. The signal Sc changes from its "L" to its "H" level when the TTL automatic electronic flash mounted on the camera has completed its charging operation and is ready to emit light. Thus, the analog switch 54 is on during a photographing operation which utilizes the electronic flash, and is off during a photographing operation which does not utilize the electronic flash. In this manner, the amplification of the non-inverting amplifier changes in accordance with the on and off condition of the switch 54.

The output terminal of the amplifier 53 is connected to one end of a variable resistor 57, which is utilized to preset film speed that is used in calculating a diaphragm aperture in accordance with film speed information. The other end of the variable resistor 57 is connected to the non-inverting input terminal of an operational amplifier 58, which functions as a comparator, and is also connected to the collector of a PNP transistor 62. The inverting input terminal of the amplifier 58 is connected to the terminal 22 through a resistor 60, which determines an exposure period under a controlled diaphragm aperture. The inverting input terminal of the amplifier 58 is also connected to the collector of a PNP transistor 61. The bases of the transistors 61, 62 are connected to the base and the collector of a PNP transistor 63, which exhibits an identical characteristic with these transistors. The collector of the transistor 63 is connected to the ground through a constant current source 64. The emitters of these transistors 61, 62 and 63 are connected to the terminal 31. The output terminal of the amplifier 58 is connected to the terminal 31 through an electromagnet 59 which controls the diaphragm.

In operation, when the TTL automatic electronic flash is connected with the camera, capable of photometry of reflection from a film surface and including the diaphragm control circuit 40, and when the power switch (not shown) turns on, the supply voltage $+V_{cc}$ is applied to the terminal 31 and a reference voltage $V_{REF}$ is applied to the terminal 22. When the shutter is charged, the trigger signal of "H" level is applied to the terminal 26, and the sample-and-hold signal $S_{SH}$ of "H" level is applied to the terminal 46. When the electronic flash is ready to emit light, the charged signal Sc of "H" level is applied to the terminal 55. As the camera is directed toward an object being photographed, light from an object being photographed which passes through the taking lens 7 and the diaphragm 14 having an open aperture value and reflected by the photometric mirror 4 impinges upon the transducer element 6. Thus, the transducer element 6 produces a photocurrent Ip in accordance with the amount of light incident thereon. Because the trigger signal of "H" is applied to the terminal 26, and thence to the control terminal of the analog switch 23, the latter is turned on, forming the feedback loop by the combination of the amplifiers 21 and 25. Consequently, the reference voltage $V_{REF}$ is applied to the non-inverting input terminal of the amplifier 25, and the integrating capacitor 27 is charged to the level of the reference voltage $V_{REF}$.

When the transducer element 6 produces the photocurrent Ip, the same current Ip flows through the emitter to the collector of the transistor 24. Consequently, the collector potential at point $P_1$ of the transistor 24 is given as follows:

$$V_{p1} = V_{REF} - \frac{kT}{q} \ln \frac{Ip}{Is_1} \quad (1)$$

where k represents Boltzmann's constant, T absolute temperature, q the charge of an electron, and $Is_1$ the inverse saturation current of the transistor 24.

When the voltage $V_1$ is applied to the base of the transistor 41 in the diaphragm control circuit 40, the correction circuit comprising the transistor 41, resistor 42 and amplifier 43 produces a voltage $V_{p2}$ at the point $P_2$ which represents the output terminal of the amplifier 43, as given below:

$$V_{p2} = V_{p1} + \frac{kT}{q} \ln \frac{V_{REF}}{Is_2 h_{FE} R_1} \quad (2)$$

$$= V_{REF} + \frac{kT}{q} \ln \frac{V_{REF} \cdot Is_1}{Ip \cdot Is_2 h_{FE} R_1}$$

where $R_1$ represents the resistance of resistor 42, $h_{FE}$ the current amplification factor of the transistor 41 and $Is_2$ the inverse saturation current of the transistor 41. Assuming that the transistor 41 exhibits the same characteristic as the transistor 24, it follows that $Is_1 = Is_2$. Hence, the equation (2) can be rewritten as follows:

$$V_{p2} = V_{REF} + \frac{kT}{q} \ln \frac{V_{REF}}{I_p h_{FE} R_1} \quad (3)$$

The voltage $V_{p2}$ is directly applied to the non-inverting input terminal of the amplifier 53. Since the analog switch 45 is turned on by the application of the sample-and-hold signal $S_{SH}$ of "H" level to its control terminal from the terminal 46, the voltage $V_{p2}$ is applied to the non-inverting input terminal of the amplifier 48 through the switch 45, charging the capacitor 47.

When the shutter release now takes place, the signal $S_{SH}$ changes to its "L" level, whereby the switch 45 is turned off. However, the output voltage $V_{p2}$ from the amplifier 43, as given by the equation (3), is held by the capacitor 47 as an open photometry value, which is taken out of the output terminal of the amplifier 48. Thus, representing the photocurrent during the open photometry by $Ip_0$, the voltage $V_{p3}$ at point $P_3$ representing the output terminal of the amplifier 48 can be derived from equation (3), as follows:

$$V_{p3} = V_{REF} + \frac{kT}{q} \ln \frac{V_{REF}}{I_{pO}h_{FE}R_1} \quad (4)$$

The voltage $V_{p3}$ obtained during the open photometry is supplied through the resistor 51 to the inverting input terminal of the amplifier 53, the non-inverting input terminal of which receives the voltage $V_{p2}$. Thus, representing the resistance of the resistors 51, 52 by $R_2$ and $R_3$, respectively, it will be seen that the voltage $V_{p4}$ at point $P_4$ representing the output terminal of the amplifier 53 can be derived from the equations (3) and (4), as follows:

$$V_{p4} = V_{p2} + \frac{R_3}{R_2}(V_{p2} - V_{p3}) \quad (5)$$

However, since the analog switch 54 is turned on by the application of the charged signal Sc of "H" level to its control terminal from the terminal 55, the resistor 52 is short-circuited, whereby $R_3 \to 0$ in the equation (5).

$$V_{p4} = V_{p2} \quad (6)$$

$$= V_{REF} + \frac{kT}{q} \ln \frac{V_{REF}}{I_{ph_{FE}}R_1}$$

Thus, when the TTL automatic electronic flash mounted on the camera is ready to emit light, the voltage $V_{p4}$ developed at the output terminal of the amplifier 53 is equal to the output voltage $V_{p2}$ developed by the amplifier 43.

It will be seen that the source 64 supplies a constant current Ij, which passes through the collector of the transistor 63. By current mirror effect, the same current Ij flows through the collectors of the transistors 61, 62. Accordingly, the current Ij flows through the variable resistor 57 connected to the output terminal of the amplifier 53, producing a voltage drop thereacross which is equal to Rsv2Ij where Rsv2 represents the resistance of the resistor 57. Hence, the voltage $V_{p5}$ at point $P_5$ or the non-inverting input terminal of the amplifier 58 is given as indicated below:

$$V_{p5} = V_{p4} + Rsv2Ij \quad (7)$$

The substitution of the equation (7) into the equation (6) yields:

$$V_{p5} = V_{REF} + Rsv2Ij + \frac{kT}{q} \ln \frac{V_{REF}}{I_{ph_{FE}}R_1} \quad (8)$$

The current Ij also flows through the resistor 60, developing a voltage drop thereacross which is equal to RpIj, where Rp represents the resistance of the resistor 60. Thus, the voltage $V_{p6}$ at point $P_6$ or the inverting input terminal of the amplifier 58 is given as follows:

$$V_{p6} = V_{REF} + RpIj \quad (9)$$

Thus it will be seen that the amplifier 58 compares the voltages $V_{p5}$ and $V_{p6}$ against each other.

When the shutter release takes place, a diaphragm mechanism (not shown) which is known in itself controls the aperture of the diaphragm 14. The diaphragm control is permitted so long as the output voltage from the amplifier 58 remains at its "L" level as a result of comparison between the voltages $V_{p5}$ and $V_{p6}$ and the electromagnet 59 remains energized.

Assuming that the object being photographed is under bright illumination, the transducer element 6 produces the photocurrent Ip of an increased magnitude, whereby the voltages $V_{p5}$ and $V_{p6}$ are related such that $V_{p5} < V_{p6}$, allowing the output from the amplifier 58 to remain at its "L" level. Accordingly, the electromagnet 59 remains energized, allowing the diaphragm 14 to be controlled to produce a decreasing aperture. As the diaphragm aperture decreases, the magnitude of the photocurrent Ip decreases gradually, and the output voltages $V_{p2}$ and $V_{p4}$ from the amplifiers 43, 53 increase gradually, thus increasing the magnitude of the voltage $V_{p5}$. When the photocurrent Ip has reduced to a point where the voltage $V_{p5}$ is equal to the voltage $V_{p6}$, the output from the amplifier 58 changes from its "L" to its "H" level, thus deenergizing the electromagnet 59 to terminate the diaphragm control. Placing the equations (8) and (9) into equality, we have $$Rsv2Ij + \frac{kT}{q} \ln \frac{V_{REF}}{I_p'h_{FE}R_1} = R_pIj \quad (10)$$

This equation (10) defines the termination of the diaphragm control. It will be understood that Ip' in this equation represents the magnitude of the photocurrent at the termination of the diaphragm control.

This will be considered in more detail with reference to the diagrams shown in FIGS. 3A to 3D. Assuming that a taking lens of F1.4 is employed and the variable resistor 57 is adjusted to film speed of ASA100, a diaphragm control takes place in accordance with a program b indicated in broken lines in FIG. 3A. Specifically, the program b indicates that for brightness of an object being photographed which is defined by the inequality $7 \leq Bv \leq 14$, the diaphragm is controlled to provide an aperture value A which provides an exposure period of 1/60 substantially synchronized with the operation of the electronic flash.

For an increased brightness of the object being photographed or $Bv \geq 7$, the voltage $V_{p5}$ and $V_{p6}$ are related such that $V_{p5} < V_{p6}$, as mentioned above. The amplifier 58 produces an output of "L" level, energizing the electromagnet 59 to permit the diaphragm control to be effected until the equation (10) is satisfied. If the brightness of the object being photographed is given by Bv=10, for example, the diaphragm control is continued until the diaphragm 14 is controlled to aperture of A=4, whereupon the output from the amplifier 58 changes to its "H" level, deenergizing the electromagnet 59 to terminate the diaphgram control by satisfying the equation (10).

When the diaphragm control is terminated, the movable mirror 3 is driven upward and the first blind 12 begins running. Thus, the trigger signal $S_0$ of "L" level is applied to the terminal 26, turning the analog switch 23 off. This interrupts the feedback loop for the amplifier 21, so that there is no flow of the photocurrent Ip through the transistor 24, but the photocurrent Ip flows into the integrating capacitor 27. Accordingly, the integrating operation is initiated when the switch 23 is turned off, and as the capacitor 27 is charged by the photocurrent Ip, the voltage thereacross gradually increases from the reference voltage $V_{REF}$. The voltage Vc across the integrating capacitor 27 is applied to the non-inverting input terminal of the amplifier 28 from the output terminal of the amplifier 25, for comparison against a decision voltage $V_J$ which is used to determine an exposure period and which is applied to the inverting input terminal of the amplifier 28. Representing the resistance of the variable resistor 30 by Rs1 and a constant current flowing through the source 29 by Ij, it will be seen that by the current mirror effect, the collector current of the transistor 36 is also equal to Ij. Hence, $$V_J = V_{REF} + Rsv1 Ij \quad (11)$$

Representing the capacitance of the capacitor 27 by $C_1$, the integrated voltage Vc is given as follows:

$$Vc = V_{REF} + \frac{Ip}{C_1} t \quad (12)$$

So long as the integrated voltage Vc is less than the decision voltage $V_J$ or $(Ip/C_1)t < Rsv1Ij$, as obtained by the combination of the equations (11) and (12), the output from the amplifier 28 remains at its "L" level, whereby the electromagnet 32 remains energized to constrain the second blind of the shutter from running. Also, the terminal 34 is maintained at its "H" level.

Since the diaphragm control mentioned above produces a diaphragm aperture (for example, A=4 for Bv=10) which prevents an exposure period from becoming less than 1/60 second, it is impossible that the integrated voltage Vc reaches the level of the decision voltage $V_J$ within a time interval less than 1/60 second. When 1/60 second has passed, the electronic flash is triggered to initiate the emission of light. Simultaneously, the voltage Vc reaches the decision voltage $V_J$. Thus, $(Ip/C_1)t \geq Rav1Ij$, whereby the output from the amplifier 28 changes to its "H" level. This deenergizes the electromagnet 32, whereby the second blind is released from the constraint and begins running. At the same time, the inverter 33 delivers the emission terminate signal $S_T$ of "L" level to the terminal 34 and thence to the electronic flash. This interrupts the emission of light from the electronic flash, and as the second blind completes its running, an exposure or a photographing operation with the aid of TTL automatic electronic flash is terminated.

Figure 3A:
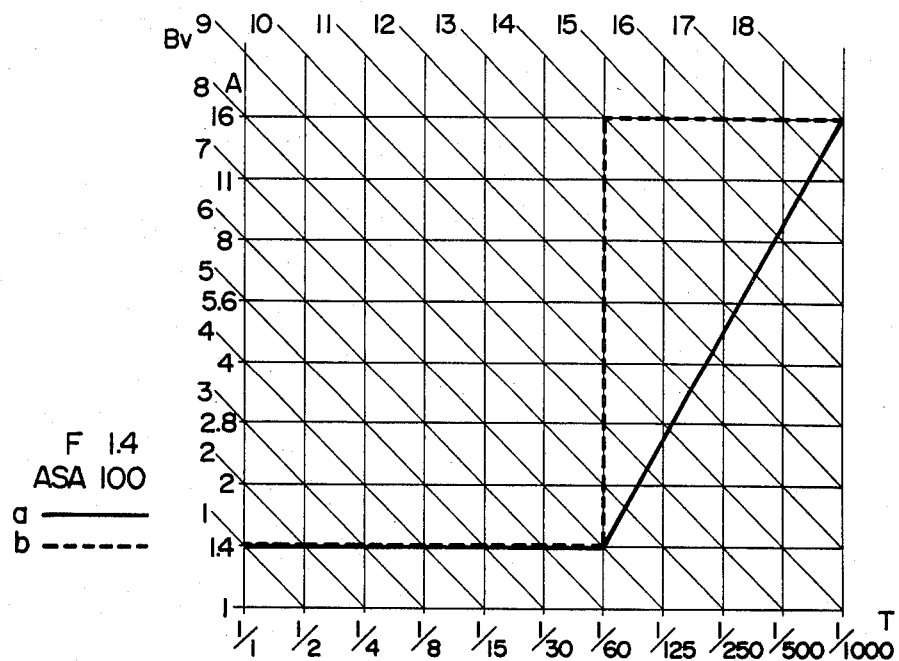
FIGS. 3A to 3D are diagrams illustrating diaphragm control programs by the exposure control circuit of FIG. 2.

To repeat, during a photographing operation with the aid of TTL automatic electronic flash, the diaphragm control circuit 40 produces a diaphragm aperture in a range of $1.4 \leq A \leq 16$ so that an exposure period of $T \approx 1/60$ is obtained for the brightness of an object being photographed which is in a range of $7 \leq Bv \leq 14$, as indicated by the program b of FIG. 3A when a taking lens of F1.4 and film speed of ASA100 are employed. Accordingly, when such diaphragm control is performed, the majority of exposure to the film is given by natural light while the electronic flash emits light during the final phase of the exposure. Thus, the exposure is immediately terminated after the emission of light from the electronic flash, causing a minimum amount of light emission from the electronic flash. As compared with the use of an electronic flash of series control type, the termination of light emission from the electronic flash after a minimum amount of emission prevents a main capacitor in the electronic flash from being entirely discharged. Thus, the charging time to prepare for the next emission is minimized.

When the object being photographed is under a very bright illumination or dark illumination which are outside the range of brightness mentioned above, an exposure period which is closely synchronized with the operation of the electronic flash cannot be obtained. Specifically, since the maximum diaphragm value is A=16, if the brightness of an object being photographed is such that Bv>14, the photocurrent Ip cannot reach the magnitude of the photocurrent Ip' if the diaphragm value is controlled to A=16. Accordingly, an exposure period will be terminated before the synchronization with the electronic flash is achieved, thus completing a photographing operation under natural light without any emission of light from the electronic flash.

As will be evident from the program b of FIG. 3A, when the object being photographed is under a dark illumination and brightness is such that Bv<7, the photocurrent Ip produced by the transducer element 6 is less than the photocurrent Ip', so that the voltages $Vp_3$ and $Vp_5$ are related such that $Vp_3 \geq Vp_5$, causing the amplifier 58 to produce an output of "H" level. Accordingly, the electromagnet 59 is deenergized from the very beginning of shutter release, leaving the aperture of the diaphragm 14 open. Thus, in this instance, the diaphragm assumes an open diaphragm value of A=1.4. In this instance, the emission of light from the electronic flash is interrupted at the time when a proper amount of exposure has been given to the film as a result of such emission, and simultaneously the second blind begins running, thus terminating an exposure.

When the electronic flash is not used, the charged signal Sc is not applied to the terminal 55, which therefore assumes "L" level maintainiing the analog switch 54 off. Accordingly, the resistor 52 is connected across the amplifier 53, the output voltage $Vp_4$ of which is given as follows, by substituting the equation (3) and (4) into the equation (5):

$$Vp_4 = V_{REF} + \frac{kT}{q} \ln \frac{V_{REF}}{I_{ph} F_E R_1} + \frac{R_3}{R_2} \left( \frac{kT}{q} \ln \frac{I_{po}}{I_p} \right) \quad (13)$$

Thus, the shutter release causes the voltage $Vp_4$ given by the equation (13) to be produced by the amplifier 53, and hence the voltage $Vp_5$ applied to the non-inverting input terminal of the amplifier 58 is given as follows:

$$Vp_5 = V_{REF} + \quad (14)$$

$$Rsv2Ij + \frac{kT}{q} \ln \frac{V_{REF}}{I_{ph} F_E R_1} + \frac{R_3}{R_2} \left( \frac{kT}{q} \ln \frac{I_{po}}{I_p} \right)$$

The voltage $Vp_5$ is compared against the voltage $Vp_6$ applied to the inverting input terminal of the amplifier 58. In this instance, the diaphragm control takes place in accordance with the program a shown in solid line in FIG. 3A. Specifically, if the brightness of an object being photographed is high enough that $Bv \geq 7$, there is produced the photocurrent Ip of a high magnitude, and hence the voltages $Vp_5$ and $Vp_6$ are related such that $Vp_5 < Vp_6$. The amplifier 58 produces an output of "L" level, whereby the electromagnet 59 is energized to control the aperture of the diaphragm 54. As the diaphragm aperture is progressively reduced, the magnitude of the voltage $Vp_5$ increases, and the output from the amplifier 58 changes to its "H" level to terminate the diaphragm control when $V_{p5}=V_{p6}$. At this time, we have from the equations (9) and (14):

$$Rsv2Ij + \frac{kT}{q}\ln\frac{V_{REF}}{Ip'h_{FE}R_1} + \frac{R_3}{R_2}\left(\frac{kT}{q}\ln\frac{Ip_O}{Ip'}\right) = RpIj \quad (15)$$

The equation (15) provides a criterion for the completion of the diaphragm control. In this equation, $Ip_O$ represents the photocurrent produced when the diaphragm 14 is open, and $Ip'$ the photocurrent at the termination of the diaphragm control.

When the diaphragm control is completed, the analog switch 23 is turned off, allowing an integrating operation to be initiated. The output voltage Vc from the amplifier 25 increases with a slope defined by the equation (12). When the voltage Vc reaches the decision voltage $V_J$ defined by the equation (11), the output from the amplifier 28 changes to its "H" level, whereupon the electromagnet 32 is deenergized, allowing the second blind to run in order to terminate an exposure. It will be apparent from the program a of FIG. 3A, the diaphragm value is controlled to lie in a range $1.4 \leq A \leq 16$ for a range of brightness defined by $7 \leq Bv \leq 18$, so that an exposure period if controlled to lie in a range of approximately $1/60 \geq T \geq 1/1000$, by the photometry of reflection from a film surface.

When the brightness is low such that $Bv \leq 7$, the open diaphragm value of $A=1.4$ is maintained, and hence an exposure period lies in a range of approximately $1/1 \geq T > 1/60$.

Figure 3B:
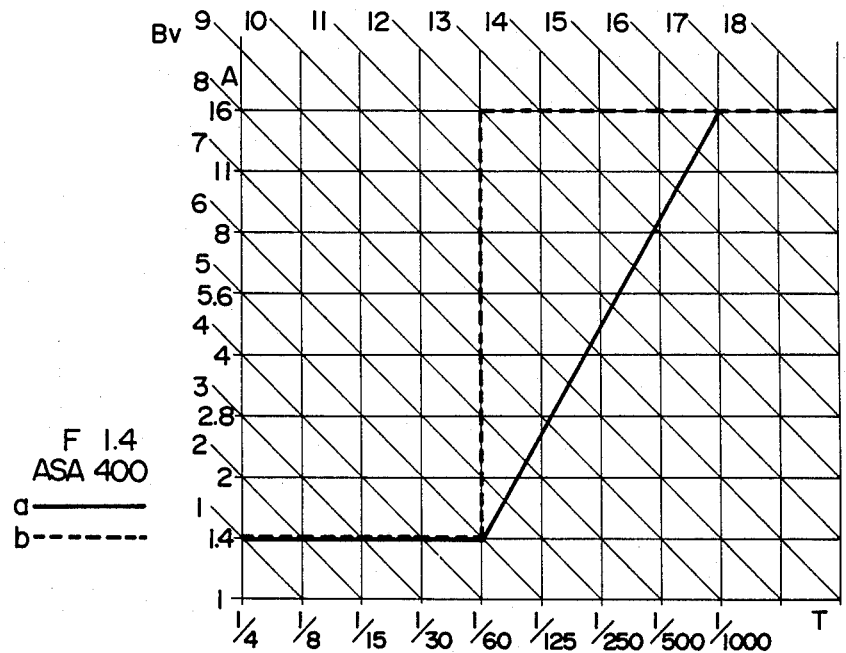

When the resistance Rsv2 of the variable resistor 57 in the diaphragm control circuit 40 which is used to preset film speed is adjusted to ASA400, the diaphragm control takes place in accordance with programs indicated in FIG. 3B. To enable an shutter period to be obtained which is defined by these programs, the resistance Rsv1 of the variable resistor 30 which is used to preset film speed is also adjusted to ASA400 in order to calculate an exposure period. When the TTL automatic electronic flash is not used, an exposure control is based on the photometry of reflection from a film surface, the program shown in FIG. 3B controls a diaphragm aperture to a value in a range of $1.4 \leq A \leq 16$ so long as the brightness of an object being photographed lies in a range of $5 \leq Bv \leq 16$, as indicated by a program a, thus producing an exposure period of $1/60 \geq T \geq 1/1000$ by the photometry of reflection from a film surface. When the TTL automatic electronic flash is connected with the camera, the diaphragm aperture is controlled in a range of $1.4 \leq A \leq 16$ or from the open value to its minimum value so long as the brightness of the object being photographed remains in a range of $5 \leq Bv \leq 12$, as indicated by a program b. As a result of such diaphragm control, an exposure period of $T=1/60$ synchronized with the operation of the electronic flash is produced as a result of the photometry of reflection from a film surface, in the same manner as mentioned above, thus terminating an exposure concurrently with the emission of light from the electronic flash.

Figure 3C:
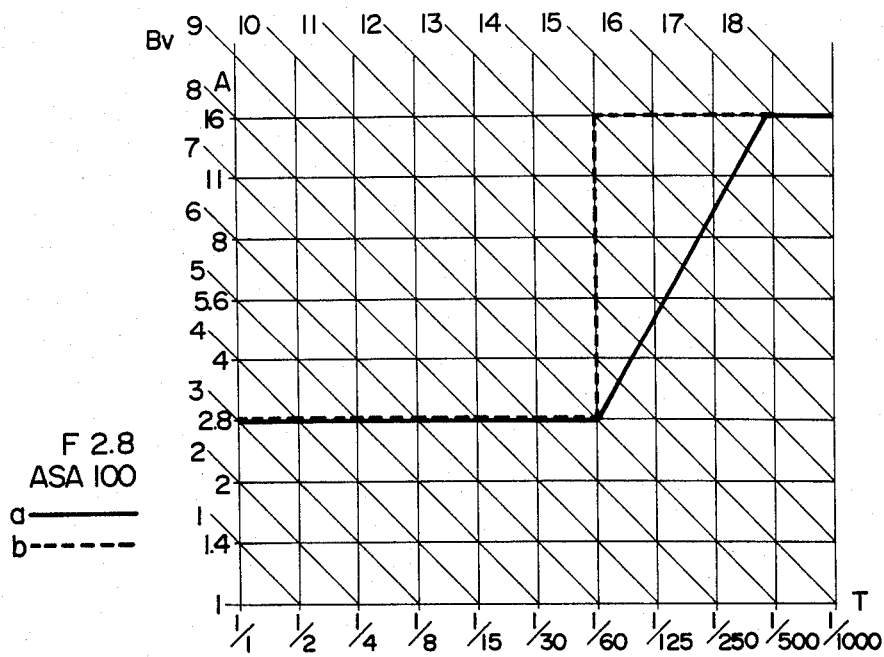
Figure 3D:
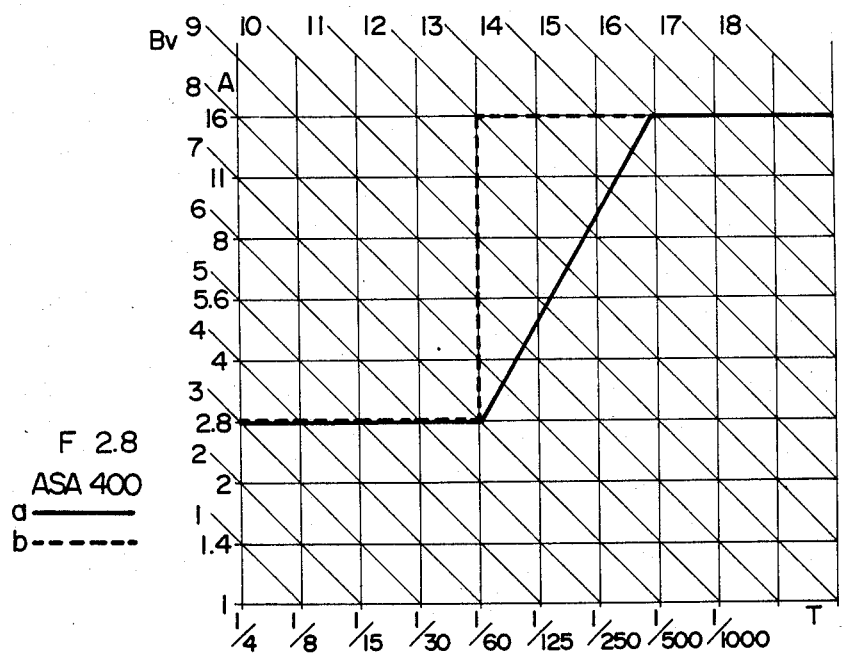

When a taking lens of F2.8 is employed together with film speed of ASA100, the diaphragm control is performed in accordance with programs shown in FIG. 3C. If the film speed of ASA400 is chosen, the diaphragm control takes place in accordance with programs shown in FIG. 3D. It will be apparent from FIGS. 3C and 3D that the diaphragm aperture is controlled from the open value ($A=2.8$) to the minimum value ($A=16$) in accordance with the brightness of an object being photographed, as indicated by programs b, and the diaphragm control assures that an exposure period is closely synchronized with the operation of the electronic flash except when the object being photographed is under a very bright and under a very dark illumination, whenever the TTL automatic electronic flash is connected with the camera capable of photometry of reflection from a film surface. Accordingly, the exposure is terminated concurrently with the emission of light from the electronic flash. When the TTL automatic electronic flash is not employed, the diaphragm control extends from the open value ($A=2.8$) to the minimum value ($A=16$) as indicated by programs a, with the exposure period being controlled in accordance with a particular value of the diaphragm aperture.

In the diaphragm control circuit 40 shown in FIG. 2, the diaphragm control extends from the open value to the minimum value. However, it will be appreciated that when taking a picture with the aid of the electronic flash, a picture of good quality can generally be not obtained with an open value of the diaphragm. Accordingly, a normal practice is to take a picture with a diaphragm aperture which is by several steps less than the open value. An embodiment which is arranged in this manner will now be described.

Figure 4:
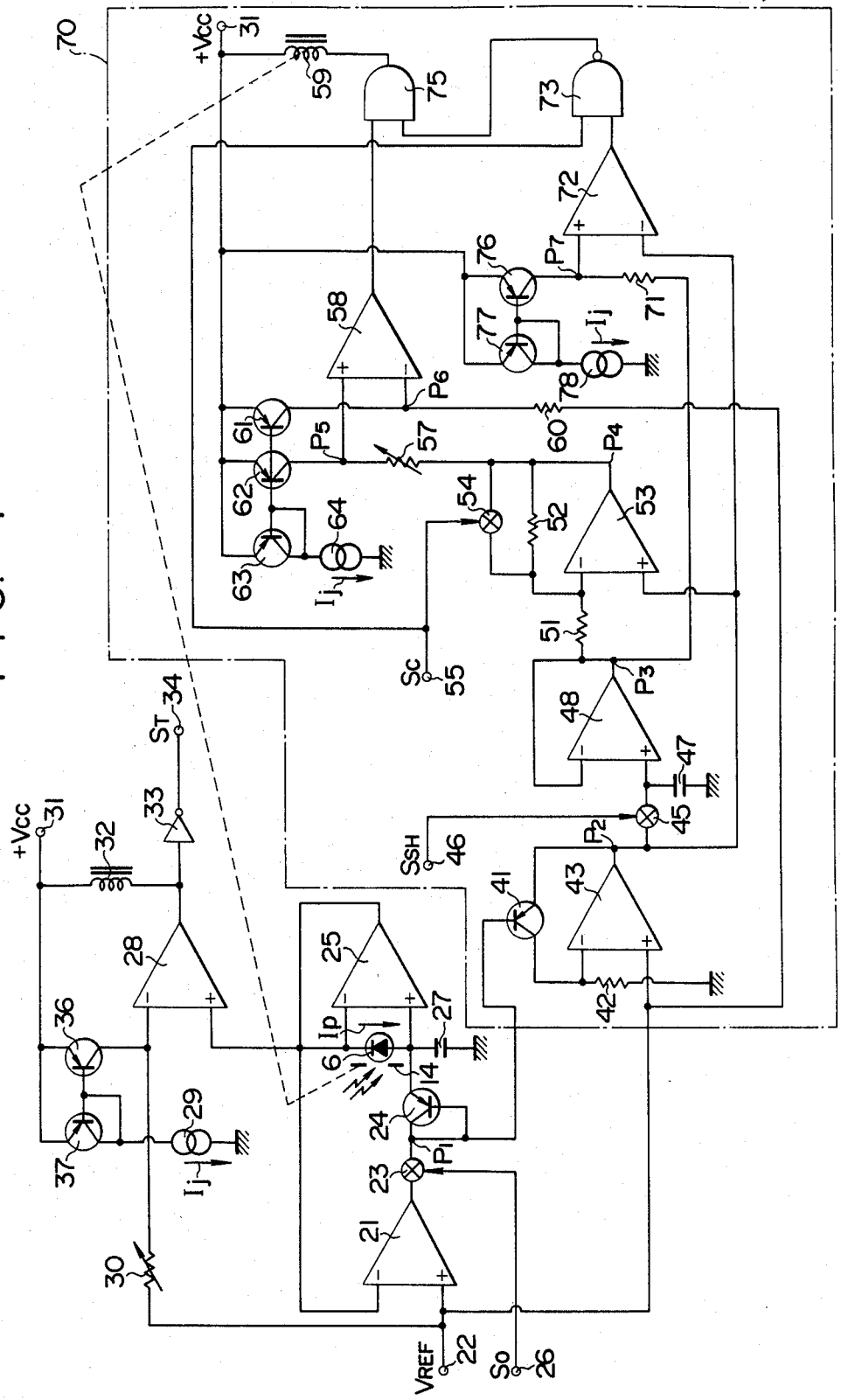
FIG. 4 is a circuit diagram of an exposure control circuit according to another embodiment of the invention.

FIG. 4 is a circuit diagram of an exposure control circuit according to another embodiment of the invention. In FIG. 4, the circuit arrangement except a diaphragm control circuit 70 is quite identical with the corresponding circuit portion shown in FIG. 2, and the diaphragm control circuit 70 is substantially similar to the diaphragm control circuit 40 shown in FIG. 2 except for certain modifications, which will be described below. Specifically, the output terminal of the amplifier 43 is connected to the inverting input terminal of an operational amplifier 72, which functions as a comparator. The output terminal of the amplifier 48 is connected through a resistor 71 to the non-inverting input terminal of the amplifier 72. The non-inverting input terminal of the amplifier 72 is connected to the collector of a PNP transistor 76, which has its base connected to the base and the collector of a PNP transistor 77, which exhibits an identical characteristic with the transistor 76. The collector of the transistor 77 is connected to the ground through a constant current source 78. The emitters of the transistors 76, 77 are connected to the terminal 31. The output terminal of the amplifier 72 is connected to one input terminal of NAND gate 73, the other input terminal of which is connected to the terminal 55, to which the electronic flash charged signal is applied. The output terminal of the gate 73 is connected to one input terminal of AND gate 75, the other input terminal of which is connected to the output terminal of the amplifier 58, which again functions as a comparator. The output terminal of the gate 75 is connected to one end of the electromagnet 59, which controls the diaphragm.

In the diaphragm control circuit 70, the constant current Ij from the source 78 flows into the collector of the transistor 77, and also flows through the resistor 71 from the collector of the transistor 76 by the current mirror effect. Hence, the voltage $V_{p7}$ at point $P_7$ which represents the noninverting input terminal of the amplifier 72 is given as follows:

$$V_{p7} = V_{p3} + R_0 I_j \qquad (16)$$

where $R_0$ represents the resistance of the resistor 71. The substitution of the equation (16) into the equation (4) yields:

$$V_{p7} = V_{REF} + R_0 I_j + \frac{kT}{q} \ln \frac{V_{REF}}{I_{p0} h_{FE} R_1} \qquad (17)$$

The amplifier 72 compares the voltage $V_{p7}$ against the output voltage $V_{p2}$ from the amplifier 43.

When taking a picture with the aid of TTL automatic electronic flash and the brightness of an object being photographed is very low, the voltages $V_{p5}$ and $V_{p6}$ applied to the non-inverting and the inverting input terminal of the amplifier 58 is related such that $V_{p5} \geq V_{p6}$, as mentioned previously, whereby the amplifier 58 produces an output of "H" level. With the diaphragm control circuit 40 of the previous embodiment, the output of the amplifier 58 directly controls the energization of the electromagnet 59, and hence in this instance the electromagnet 59 will be deenergized at the same time as the shutter release, fixing the diaphragm to its open value. However, with the diaphragm control circuit 70, even though the output from the amplifier 58 is at its "H" level in this instance, the voltage $V_{p7}$ applied to the non-inverting input terminal of the amplifier 72 is higher by $R_0 I_j$ than the voltage applied to the inverting input terminal thereof, or the output voltage $V_{p2}$ from the amplifier 43, whereby the amplifier 72 produces an output of "H" level. Since the electronic flash is connected to the camera and the charged signal Sc applied to the terminal 55 assumes its "H" level, the gate 73 produces an output of "L" level, so that the gate 75 produces an output of "L" level even though the output from the amplifier 58 is at its "H" level, thus allowing the electromagnet 59 to be energized to initiate the diaphragm control. The aperture of the diaphragm 14 is progressively reduced and hence the magnitude of the photocurrent Ip progressively decreases to allow the voltage $V_{p2}$ to increase gradually until it reaches the voltage $V_{p7}$ or when the following equality applies (see the equations (3) and (17)):

$$\frac{kT}{q} \ln \frac{V_{REF}}{I_p' h_{FE} R_1} = R_0 I_j + \frac{kT}{q} \ln \frac{V_{REF}}{I_{p0} h_{FE} R_1} \qquad (18)$$

Thereupon, the output from the amplifier 72 changes to its "L" level, whereby the output from the gate 73 changes to its "H" level, causing the gate 75 to produce an output of "H" level. Consequently, the electromagnet 59 is deenergized, terminating the diaphragm control. It will be understood that $I_{p0}$ appearing in the equation (18) represents the magnitude of the photocurrent when the diaphragm 14 is open while $I_p'$ the magnitude of the photocurrent at the termination of the diaphragm control.

Figure 5:
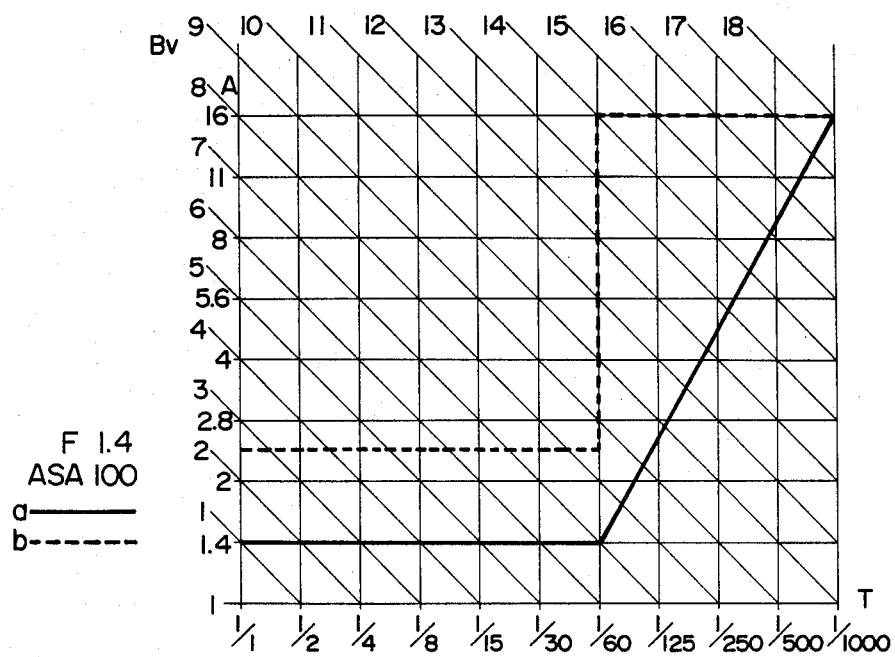
FIG. 5 is a diagram illustrating diaphragm control programs by the exposure control circuit of FIG. 4.

Stated differently, when the TTL automatic electronic flash is used, the presence of the electronic flash charged signal Sc causes the diaphragm aperture to be reduced by a given number of steps from the open value which is determined by the bias voltage $R_0 I_j$ developed across the resistor 71. Accordingly, the diaphragm control performed by the diaphragm control circuit 70 takes place in accordance with programs shown in FIG. 5, for example. FIG. 5 illustrates programs for the use of a taking lens of F1.4 and a film speed of ASA100. As compared with the programs shown in FIG. 3A, it will be seen that the programs a used during a normal photographing operation which occurs without the aid of TTL automatic electronic flash remains the same between both Figures. However, as to the programs b which occur when the TTL automatic electronic flash is used to take a picture, it will be seen in the arrangement of FIG. 5 that the diaphragm aperture does not remain at its open value of 1.4, but assumes a value ($A \approx 2.2$) which is reduced by one and one-half steps from the open value ($A = 1.4$). Consequently, when taking a picture with the aid of TTL automatic electronic flash, the diaphragm aperture is controlled to a value which is less than the open value by a given number of steps, assuring the achievement of a satisfactory photographing operation under flashlight.

When the object being photographed has a certain level of brightness, the diaphragm control produces a diaphragm value in the range from the last mentioned diaphragm value ($A \approx 2.2$) to minimum aperture ($A = 16$) which assures an exposure period ($T = 1/60$) substantially synchronized with the operation of the electronic flash, in a similar manner as mentioned above in connection with the preceding embodiment. Accordingly, the exposure is terminated substantially concurrently with the emission of light from the electronic flash, and the light emission from the electronic flash is suppressed to its minimum value.

When the electronic flash is not used, the charged signal Sc of "L" level is not applied to the terminal 55, whereby the output from the gate 73 assumes its "H" level. Accordingly, the output level from the gate 75 coincides with the output level from the amplifier 58, allowing a diaphragm control in the same manner as in the embodiment shown in FIG. 2.

In the diaphragm control circuits 40, 70 of the described embodiments, it is the resistance Rp of the resistor 60 which determines an exposure period of $T = 1/60$ which is obtained as a result of the diaphragm control. Accordingly, by a suitable choice of the resistance Rp, the diaphragm control may produce an exposure period of $T = 1/30$, for example. In the photometry of reflection from a film surface, an exposure period is determined as a result of an immediate photometry of light reflection from a film surface. Hence, if there occurs a change in the brightness of an object being photographed during the exposure of the film, there results a corresponding change in the exposure period. To assure the emission of light from the electronic flash, an exposure period may be established which is slightly longer than that synchronized with the operation of the electronic flash.

What is claimed is:

1. In a TTL direct photometry camera capable of photometry of reflection from a film surface and having the capability to control the amount of light emission from a TTL automatic electronic flash, an exposure control circuit associated with the TTL automatic electronic flash, comprising:

a photometric circuit for deriving a voltage corresponding to an output current from a photoelectric transducer element which is used for the purpose of photometry:

a circuit for calculating a diaphragm value, the circuit being operative whenever the TTL automatic electronic flash is used in combination with the camera, and responsive to the magnitude of the output voltage from the photometric circuit which depends on the brightness of an object being photographed, for calculating a diaphragm value for the camera to establish an exposure period which is equal to or greater than the exposure period synchronized with the operation of the electronic flash so long as the brightness value is below a predetermined upper limit;

a reference voltage circuit for providing a reference voltage corresponding to the exposure period which is equal to or greater than the exposure period synchronized with the operation of the electronic flash;

a comparator for comparing an output voltage from the calculation circuit against the reference voltage supplied from the reference voltage circuit;

means for controlling a diaphragm opening in accordance with an output from the comparator; and an exposure control circuit for establishing an exposure period in accordance with the brightness of an object being photographed.

2. An exposure control circuit according to claim 1, in which the calculation circuit for calculating a diaphragm value comprises a correction circuit for converting a value of the brightness of an object being photographed, which is determined during open photometry into a linear quantity which is suitable for use in the apex calculation, a non-inverting amplifier receiving an output voltage from the correction circuit at its input, a capacitor for holding an output voltage from the correction circuit in response to a sample-and-hold signal when a shutter of the camera is charged, an analog switch responsive to the sample-and-hold signal for coupling said capacitor to said correction circuit, another analog switch for switching its output level when the electronic flash mounted on the camera has completed its charging operation and is ready to emit light for coupling only the output voltage of the calculation circuit, which is developed during the fully-open diaphragm condition, a constant current source, a current mirror circuit and a variable resistor, which is used to preset film speed for modifying the signal applied to the comparator.

3. An exposure control circuit according to claim 1 in which the reference voltage circuit comprises a resistor connected to a terminal to which the reference voltage is applied, the resistor having a resistance which determines an exposure period, a constant current source, and a current mirror circuit coupled to said constant current source for providing said resistor with a predetermined constant current.

4. An exposure control circuit according to claim 1 in which the comparator comprises an operational amplifier.

5. An exposure control circuit according to claim 1 in which said means for controlling the diaphragm value comprises an electromagnet.

6. An exposure control circuit according to claim 1 in which the given diaphragm value represents an open diaphragm value.

7. An exposure control circuit according to claim 1 in which the given diaphragm value represents a diaphragm value which is a given number of steps less than the open diaphragm value.

8. An exposure control circuit according to claim 7 in which the given number of steps is determined by a resistor which presets a bias voltage to the open photometric value against which a photometric output voltage after the shutter release is compared.

9. The exposure control circuit of claim 1 wherein the diaphragm values determined by the circuit for calculating a diaphragm value range from a full open diaphragm value corresponding to a minimum aperture based upon the brightness of the object being photographed;

detecting means for generating a detecting signal in response to detection of a stop-down operation of a diaphragm from the full-open diaphragm value by a predetermined value while the exposure control circuit is receiving an electronic flash in use condition signal; and an energizing circuit for energizing said diaphragm opening controlling means so long as the diaphragm control signal and the detecting signal are both present.

10. An exposure control circuit according to claim 9 in which the detecting signal of the detecting means is terminated when the difference between the brightness values of the object being photographed measured through the taking lens when the diaphragm is fully open and when the diaphragm is stopped down reaches a predetermined value.

11. An exposure control circuit according to claim 10 in which the predetermined value is 1.5 EV.

12. An exposure control circuit according to claim 1 wherein the exposure period is a constant period.

13. Exposure control apparatus for use in a TTL direct photometry camera comprising:

a photometric circuit including a photoelectric transducer element for generating a voltage representing light reflected from the object to be photographed;

a calculating circuit responsive to said photometric circuit for generating a voltage representing a diaphragm value;

first comparator means comparing said diaphragm value against a reference level for generating a signal for controlling the diaphragm opening in accordance with object brightness;

second comparator means comparing the integrated output of said photometric circuit with a predetermined reference level upon shutter release for generating a flash emission terminate signal dependent upon object brightness, said terminate signal simultaneously operating the shutter to close.

* * * * *

UNITED STATES PATENT AND TRADEMARK OFFICE
CERTIFICATE OF CORRECTION

PATENT NO. : 4,514,074

DATED : April 30, 1985

INVENTOR(S) : Kazunori Mizokami

It is certified that error appears in the above-identified patent and that said Letters Patent is hereby corrected as shown below:

Column 1, line 44, change "automtic" to --automatic--.

Column 6, line 30 change "$V_1$" to --$Vp_1$--.

Signed and Sealed this

Twelfth Day of November 1985

[SEAL]

Attest:

DONALD J. QUIGG

Attesting Officer

Commissioner of Patents and Trademarks